March 30, 1965 N. C. DICKERSON, JR 3,176,238
VOLTAGE EQUALIZING CIRCUIT FOR CONSTANT GAIN DURING SWITCHING OF AGC CIRCUIT
Filed Dec. 21, 1962
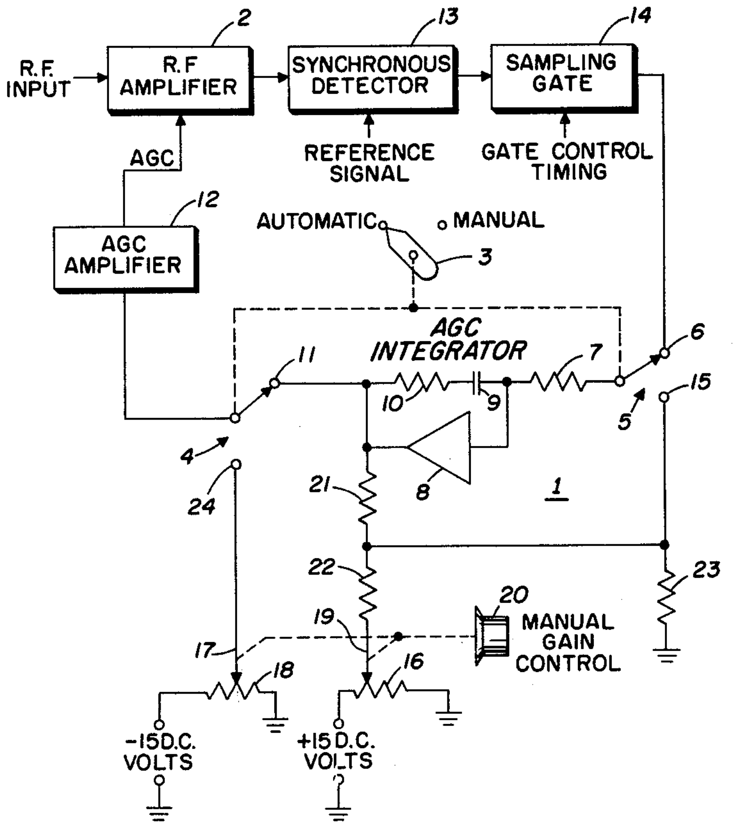
INVENTOR.
Norman C. Dickerson, Jr.
BY Moody and Antrim
Agents 3,176,238
Patented Mar. 30, 1965

3,176,238

VOLTAGE EQUALIZING CIRCUIT FOR CONSTANT GAIN DURING SWITCHING OF AGC CIRCUIT

Norman C. Dickerson, Jr., Dallas, Tex., assignor to Collins Radio Company, Cedar Rapids, Iowa, a corporation of Iowa Filed Dec. 21, 1962, Ser. No. 246,624
3 Claims. (Cl. 330—134)

The present invention pertains to AGC (automatic-gain-control) circuits and particularly to AGC circuits that have long time-constants and that are used interchangeably with manual gain control circuits.

The gain control circuit that is described below may be applied to different types of radio receivers and is particularly applicable to equipments, such as loran receivers used for long range navigation, that receive pulses. In receivers of this type, the intervals between applications of coded pulses to detector circuits are long compared with the duration of received pulses. In order to convert the pulses into constant, direct-current AGC voltage, the AGC circuits of the receivers have integrators with long-time constants. The time required for the AGC circuit to adjust immediately after large abrupt changes in signal level is noticeably long.

When the gain must be changed quickly, as it must when searching for a signal or when making adjustments of equipment, the AGC conductor of a controlled amplifier is transferred to a manual gain control; and if the input of the AGC integrator is still connected to the output of the detector that is connected to the controlled amplifier, the capacitor of the integrator is very likely to acquire a charge that is much different from that required at the instant that the AGC integrator is again transferred back to the AGC conductor. For example, when the manual gain control is set for providing a detector output that is somewhat higher than the level normally provided during control by the AGC, the capacitor of the integrator is charged in the direction that, if the AGC were controlling, would normally reduce gain. Since the output of the AGC is disconnected, the bias at the input of the AGC is applied continually until the capacitor has acquired a substantial incorrect charge. Then, as the gain control of the amplifier is transferred again to the AGC, the gain of the amplifier is reduced abruptly so that the signal applied to the detector is negligible. The receiver is, therefore, inoperative while the charge on the capacitor of the integrator is slowly changing to the value required to provide normal signal level at the detector.

According to this invention, the input of the AGC integrator is switched to a voltage equalizing circuit when the gain control conductor of the amplifier is transferred from the output of the integrator to the manual gain control. The equalizing circuit applies to the input of the integrator a voltage that is controlled in unison with the manual gain control so that the output voltage of the integrator will be maintained the same as the control voltage provided by the manual gain control. Then, as the gain control of the amplifier is transferred back to the AGC, the AGC voltage is already of a correct value to provide a suitable useable detector output. Only a slight change in AGC voltage will ever be required to return the detector output to its normal controlled level.

An object of the present invention is to provide a voltage equalizing circuit that maintains the output voltage of an AGC equal to the output voltage of an interchangeable manual gain control at all times while the manual control is being used to control the gain.

The following description may be more readily understood by reference to the accompanying drawing in which the single figure shows a schematic diagram of the integrator and voltage equilizing circuit of this invention.

The AGC circuit 1 shown in the accompanying drawing is connected to circuits of a radio receiver that is part of a system that synchronizes time very accurately between locations. The output of the AGC circuit is connected to the AGC conductor of the radio-frequency amplifier 2. Control knob 3 provides either automatic or manual control of the gain of the radio-frequency amplifier 2. When the control knob is positioned for automatic operation, the input of the AGC circuit 1 is connected through switch section 5 of the manual-automatic switch to receive direct-current pulses from the detector of the receiver and the output of the AGC circuit is connected through section 4 of the switch to the AGC of the radio-frequency amplifier 2.

The detector circuits apply pulses of direct-current voltage to contact 6 of the switch section 5. The selector arm of the switch 5 is coupled to resistor 7 at the input of an integrator circuit. The time-constant of the integrator circuit being long, the change in control voltage lags abrupt changes in incoming signal strength. Particularly, in other circuit arrangements in which the integrator continues to be connected to the output of the detector circuit while the gain of the radio-frequency amplifier is being controlled manually, the integrator will not adjust quickly when the control circuits of the radio-frequency amplifier are switched from manual control to AGC. The resistor 7 is connected to a direct-current amplifier 8 of the integrator. Capacitor 9 and resistor 10 are connected in series between the output and the input of the amplifier 8. The required long time-constant is provided namely by the charging circuit comprising resistor 7 and capacitor 9 functioning in conjunction with amplifier 8. Resistor 10 is inserted between the input and the output of amplifier 8 to provide stability. The output of the integrator is connected through contact 11 of the switch section 4 to the input of an AGC direct-current amplifier 12. The output of the amplifier 12 is connected to the AGC conductor of radio-frequency amplifier 2 to control gain in the conventional manner.

When the AGC circuit of this invention is connected as shown in the accompanying drawing, the amplitude of coded pulses that are applied to the detector is controlled. Groups of coded pulses of radio-frequency carrier signal are applied to the input of the radio-frequency amplifier 2. The output of the radio-frequency amplifier is connected to one input of a synchronous detector 13. Another input of the synchronous detector 13 is connected to a source of reference signal that has the same frequency as the carrier signal at the output of the radio-frequency amplifier. The phase of the reference signal is controlled relative to the phase of the incoming signal to provide amplitude detection in the output of the synchronus detector 13. The output of the synchronous detector is connected through a sampling gate 14 to the contact 6 of switch section 5 for connection to the input of the AGC integrator 1. A gate control timing circuit that is connected to the sampling gate 14 controls the conductivity of the gate. When a control pulse of short duration is applied to the sampling gate 14, the gate passes a small portion of a coincident incoming pulse from the output of the detector to the input of the integrator.

When the incoming signal that is applied to the radio-frequency amplifier 2 is increasing in amplitude, the direct-current voltage that is applied from the sampling gate 14 to the input of the integrator is increasing in a positive direction to cause the output of the integrator that is applied through switch section 4 to the AGC circuit to increase in a negative direction. The direction in which each of the voltages is changing is dependent upon the particular circuit design. In this particular embodiment, amplifier 8 is a single stage of amplification in which voltage is inverted between its input and its output. As the voltage that is applied through the AGC amplifier 12 to the AGC circuit of the radio-frequency amplifier 2 increases negatively, the gain of the radio-frequency amplifier is reduced to provide the desired level of output in the usual manner. Likewise, if the strength of the incoming signal decreases, the voltage applied to the AGC circuit becomes less negative to increase the gain of the radio-frequency amplifier 2.

When the control knob 3 is operated to Manual, the resistor 7 at the input of the integrator is connected through the switch contact 15 of the switch section 5 to a voltage equalizing resistive network that is coupled to the output of the integrator and to a potentiometer 16. Also, the input of the AGC amplifier 12 is disconnected from the output of the integrator and is connected through contact 24 of switch section 4 to the control arm 17 of a potentiometer 18. The control arm 17 of potentiometer 18 and the control arm 19 of potentiometer 16 are coupled to a manual gain control knob 20. Potentiometer 18 is connected across a source of negative voltage so that the voltage applied to the input of the AGC amplifier 12 can be varied between 0 voltage (ground) and −15 volts. The potentiometer 16 is connected across a source of positive voltage so that the voltage applied to a feedback resistive network that is coupled between the output and the input of the integrator can be varied between 0 voltage and +15 volts. The resistive elements of potentiometer 16 and potentiometer 18 are similar so that the voltages on the respective arms always have equal amplitude but opposite polarities.

While the gain of the radio-frequency amplifier 12 is being controlled manually, the voltage at the input of the AGC integrator is controlled by potentiometer 16 so that the voltage at the output of the integrator is maintained equal to the voltage that is being applied to the AGC control conductor from the arm 17 of the potentiometer 18. More particularly, the voltage across capacitor 9 that controls the time-constant of the integrator circuit is maintained at a value required to prevent an abrupt change in AGC voltage when the automatic manual selector switch is operated from its manual position to its automatic position. The resistive network that is effective to control the integrator by feedback voltage includes resistor 21 and resistor 22 connected in series between the output of the integrator and the arm 19 of potentiometer 16. The input of the integrator is connected to the junction of the resistors 21 and 22. The resistive values of resistors 21 and 22 may be equal, and resistor 23 may be connected between ground and the junction of resistors 21 and 22 to provide approximately a mid-point between ground and the output of the integrator. The mid-point connection provides at the input of the integrator the relatively small direct-current voltage that is required with respect to ground to maintain the voltage at the output of the integrator equal to the voltage that is being applied from potentiometer 18 to the AGC circuit of amplifier 12. For example, suppose that the position of a manual gain control 20 has just been operated to provide −3 volts from the arm 17 of potentiometer 18 to the AGC control circuit. Simultaneously, the value of the voltage on the arm 19 of potentiometer 16 has been changed to +3 volts. A change in voltage at the junction of resistor 21 and resistor 22 is applied to the input of the integrator to cause the output voltage of the integrator to change rather slowly until it reaches −3 volts. The voltage at the junction of resistor 21 and resistor 22 is now relatively small with reference to ground so that the voltage at the output of the integrator is constant and equal to the control voltage being applied from arm 17 of potentiometer 18.

Although the interchangeable manual gain control and AGC circuits of this invention have been described with respect to a single embodiment, equivalent gain control circuits that provide substantially constant gain as the gain control is transferred from manual to automatic circuits may be within the scope of the following claims.

What is claimed is:

1. An amplifier gain control circuit having first and second gain controls, an amplifier circuit having a gain control conductor to which control voltage is to be applied, switching means for selectively connecting the outputs of said first and second gain controls to said gain control conductor, said second gain control having an integrator with a long time-constant, means effective during selection of said second gain control to apply to the input of said integrator voltage proportional to the signal strength at the output of said amplifier circuit that is being controlled by application of voltage to said gain control conductor, and means effective during selection of said first gain control to apply to the input of said integrator a voltage that is the difference between the voltage applied by said first gain control to said gain control conductor and the output voltage of said integrator so that the latter voltage is equal to that appiled to said gain control conductor by said first gain control.

2. In an amplifier gain control circuit having manual control means including a manual gain control, automatic-gain-control means, a gain control conductor, and switching means for transferring said gain control conductor between the output of said manual control means and the output of said automatic-gain-control means, said automatic-gain-control means having an integrator with a long time-constant; a voltage equalizing circuit for maintaining the output voltage of said integrator equal to the output of said manual control means while said manual control means is connected to said gain control conductor, said voltage equalizing circuit comprising an adjustable source of bias voltage the magnitude of which is determined by the position of said manual gain control to be proportional to said output of said manual control means, a voltage divider, said voltage divider being connected between the output of said integrator and said source of bias voltage, said switching means when positioned for connecting said gain control conductor to the output of said automatic-gain-control means also connecting the input of said integrator to the output of an amplifier that has its gain controlled by application of voltage to said gain control conductor, and during control by said manual control means connecting the input of said integrator to said voltage divider at a point that causes the output voltage of said integrator to be equal to the voltage being supplied by said manual gain control means.

3. A gain control circuit comprising a manual gain control and an automatic gain control to be used interchangeably, an amplifier circuit, an automatic-gain-control conductor to which control voltage is applied to control the gain of said amplifier circuit, said manual gain control comprising a voltage source and a first potentiometer connected to said voltage source for applying a voltage according to the setting thereof to said automatic-gain-control conductor, said automatic gain control including an integrator having a long time-constant, manual switching means for interchangeably connecting said automatic-gain-control conductor to said first potentiometer and to the output of said integrator, a second potentiometer operated in unison with said first potentiometer to supply a voltage proportional to that applied to said automatic-gain-control conductor, a voltage divider connected between said second potentiometer and the output of said integrator, switching means for connecting the input of said integrator to the output of said amplifier circuit while the gain of said amplifier is being controlled by said automatic gain control and to an intermediate point of said voltage divider while the gain is being controlled by said manual gain control, and said integrator operating in response to the application of voltage from said voltage divider to equalize the voltage at its output with that being applied by said manual gain control to said automatic-gain-control conductor.

References Cited by the Examiner

UNITED STATES PATENTS 2,282,377 5/42 Place ---------------330—134 X

ROY LAKE, *Primary Examiner.*